US007008071B2

(12) United States Patent
Buelow, II et al.

(10) Patent No.: US 7,008,071 B2
(45) Date of Patent: Mar. 7, 2006

(54) LIGHT COLLECTION SYSTEM CONVERTING ULTRAVIOLET ENERGY TO VISIBLE LIGHT

(75) Inventors: Roger F. Buelow, II, Gates Mills, OH (US); John M. Davenport, Middleburg Heights, OH (US); Gregory P. Frankiewicz, Mayfield Heights, OH (US)

(73) Assignee: Fiberstars Incorporated, Solon, OH (US)

( * ) Notice: Subject to any disclaimer, the term of this patent is extended or adjusted under 35 U.S.C. 154(b) by 0 days.

(21) Appl. No.: 10/793,059

(22) Filed: Mar. 4, 2004

(65) Prior Publication Data

US 2004/0174696 A1 Sep. 9, 2004

Related U.S. Application Data

(60) Provisional application No. 60/452,822, filed on Mar. 7, 2003.

(51) Int. Cl.
*F21V 9/16* (2006.01)

(52) U.S. Cl. ........................ 362/84; 362/255; 362/293; 362/510; 362/583

(58) Field of Classification Search .................. 362/84, 362/293, 255, 256, 263, 510, 583; 313/113, 313/114, 485, 573
See application file for complete search history.

(56) References Cited

*Primary Examiner*—John Anthony Ward
*Assistant Examiner*—Mark Tsidulko
(74) *Attorney, Agent, or Firm*—Charles E. Bruzga; Bruzga & Associates

(57) ABSTRACT

A light collection system comprises a light source with a bulbous section for emitting radiant energy in the direction of first and second portions of the bulbous section. A reflecting surface directs visible light from the light source to the first portion. Another reflecting surface directs UV energy from the light source to the second portion. A first angle-to-area converter receives visible light in the first portion and decreases the angle of the visible light to a desired angle. A second angle-to-area converter receives UV energy in the second portion and decreases the angle of the UV energy to a desired angle. A phosphor layer receives UV energy downstream of the second angle-to-area converter and converts the UV energy to visible light. A third angle-to-area converter receives visible light from the phosphor and reducing the angle of such light to an angle optimized for entering a fiber optic cable.

15 Claims, 3 Drawing Sheets

LIGHT COLLECTION SYSTEM CONVERTING ULTRAVIOLET ENERGY TO VISIBLE LIGHT

This application claims priority from U.S. Provisional Application No. 60/452,822 filed Mar. 7, 2003.

FIELD OF THE INVENTION

The present invention relates to a light collection system for extracting more visible light from a light source by converting ultraviolet ("UV") energy into visible light.

BACKGROUND OF THE INVENTION

Using non-imaging optics, it is currently possible to achieve over 90% collection of visible light from a light source such as a metal halide lamp. The light can be used to couple into a fiber optic illumination system, but typically any UV energy is filtered from light directed to a fiber optic cable using absorbing or reflecting filters. This is to prevent degradation of the fiber optic cable.

One way prior art lighting systems used UV energy is by employing phosphor to convert UV energy to visible light. Phosphor conversion systems have been used in fluorescent lamps, metal halide lamps, and light emitting diodes to produce light or change the color of light. However, phosphors do not conserve the angular distribution of the driving light—the light they emit has a broader angular distribution than the light absorbed. This increase in angular distribution often reduces the brightness of phosphor-based lamps sufficiently so as to be difficult to use in efficient, compact optical coupling systems such as lighting fixtures or fiber optic illuminators. What is needed is a compact way of improving light-output quantity and quality using phosphors.

It would be desirable to provide a light collection system in which UV energy is captured and converted into visible light with phosphor. It would be desirable to provide a compact way of doing so while improving both light-output quantity and quality. This would increase the visible light provided from a light source that produces UV energy in addition to visible light. The additional visible light could be directed to a fiber optic cable without causing UV damage to the cable.

SUMMARY OF THE INVENTION

The current invention seeks to improve quantity of light collected from a metal halide lamp and directed into a fiber optic cable of compact size by using phosphors.

Some light sources used in a fiber optic illumination system, especially metal halide light sources, produce a significant amount of UV energy. The inventive system extracts more visible light from such a light source, as set forth in the following specification. The claimed designs utilizes so-called reflecting surfaces made from "thin film" coatings and non-imaging optics to collect visible light and UV energy, and then uses phosphor to convert the UV energy into additional visible light. In this way, the UV energy is harnessed and converted into usable visible light and the system has a net increase in delivered visible light. This net increase can be sufficient to overcome coupling optics inefficiencies such that the system delivers more light than the bulb produces.

In accordance with a preferred form of the invention, a light collection system comprises a light source with a bulbous section for emitting radiant energy in the direction of first and second portions of the bulbous section that are preferably opposite each other. A reflecting surface directs visible light from the light source to the first portion. Another reflecting surface directs UV energy from the light source to the second portion. A first angle-to-area converter receives visible light in the first portion and decreases the angle of the visible light to a desired angle. A second angle-to-area converter receives UV energy in the second portion and decreases the angle of the UV energy to a desired angle. A phosphor layer receives UV energy downstream of the second angle-to-area converter and converts the UV energy to visible light. A third angle-to-area converter receives visible light from the phosphor and reducing the angle of such light to an angle optimized for entering a fiber optic cable.

The foregoing light collection system captures UV energy and converts it into visible light with phosphor. The light collection system is compact and It does so in compact and improves both light-output quantity and quality. This increases the visible light provided from a light source that produces UV energy in addition to visible light. The additional visible light can be directed to a fiber optic cable without causing UV damage to the cable.

BRIEF DESCRIPTION OF THE DRAWINGS

In the drawings, in which like reference numerals refer to like parts.

DETAILED DESCRIPTION OF THE INVENTION

Figure 1:
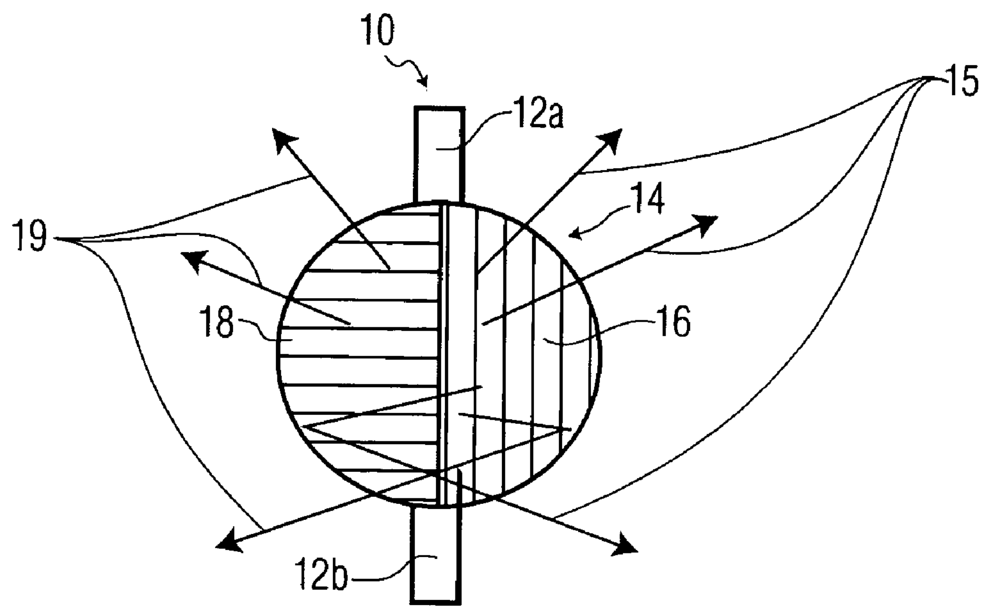
FIG. 1 is a simplified, side plan view of a light source with a bulbous section having respectively different optical coatings on opposite sides of the bulbous sections; with the coatings being shown with vertical or horizontal cross-hatch lines for convenience although a cross-sectional view of the coatings is not being shown.

FIGS. 1–4 show sequential stages of construction of a preferred system of light-system elements, starting with an arctube and proceeding to a complete system. As mentioned above, like reference numerals refer to like parts. This means, for instance, in some of the later figures, description of a part to which reference is made by a reference numeral will be found in connection with an earlier figure.

FIG. 1 shows a light source 10, such as a metal halide arctube lamp, having arms 12_a_ and 12_b_ and a bulbous section 14. Preferably, the right-hand half, or hemisphere, of bulbous section 14 has a coating 16 that passes visible light but reflects UV energy back into bulbous section 14. Preferably, the left-hand half, or hemisphere, of the bulbous section has a coating 18 that passes UV energy but reflects visible light back into the bulbous section. The left- and right-hand hemispheres are preferably positioned opposite to each other.

Coating 16 is designed to allow visible light (e.g, rays 15) to pass but to reflect UV energy back into bulbous section 14. Coating 16 preferably also contains anti-reflective ("AR") material optimized for visible light, to promote better transmission of visible light through coating 16. Coating 18 is designed to allow UV energy (e.g, rays 19) to pass but to reflect visible light back into bulbous section 14. Coating 18 preferably also contains AR material optimized for UV energy, to promote better transmission of UV energy through coating 18. An idealized version of light source 10 would have the right-shown approx. hemisphere of the bulbous section emitting all of the visible light from the arctube and the left-shown approx. hemisphere would emit all of the UV energy. In reality, the visible light- and UV energy-reflecting materials in coatings 16 and 18 are not perfect reflectors, and various light absorption elements such as the quartz arc tube reduce transmission so that about 80% of visible light and 80% of UV energy respectively pass through coatings 16 and 18.

Coatings 16 and 18 are known in the art as "thin film" coatings. Such coatings are also known as multi-layer optical interference coatings. The material used for the coating would include those high index materials that are transparent to most wavelengths of UV energy and can handle the high temperatures encountered near the light source. HfO2, ZrO2, and AlO2 are all good choices for this coating. Coating could be done, for example, by sputtering machines like the MICRODYN sputtering machine, or by LPCVD machines like the ISODYN LPCVD machine, both sold by DSI of Santa Rosa, Calif.

Figure 2:
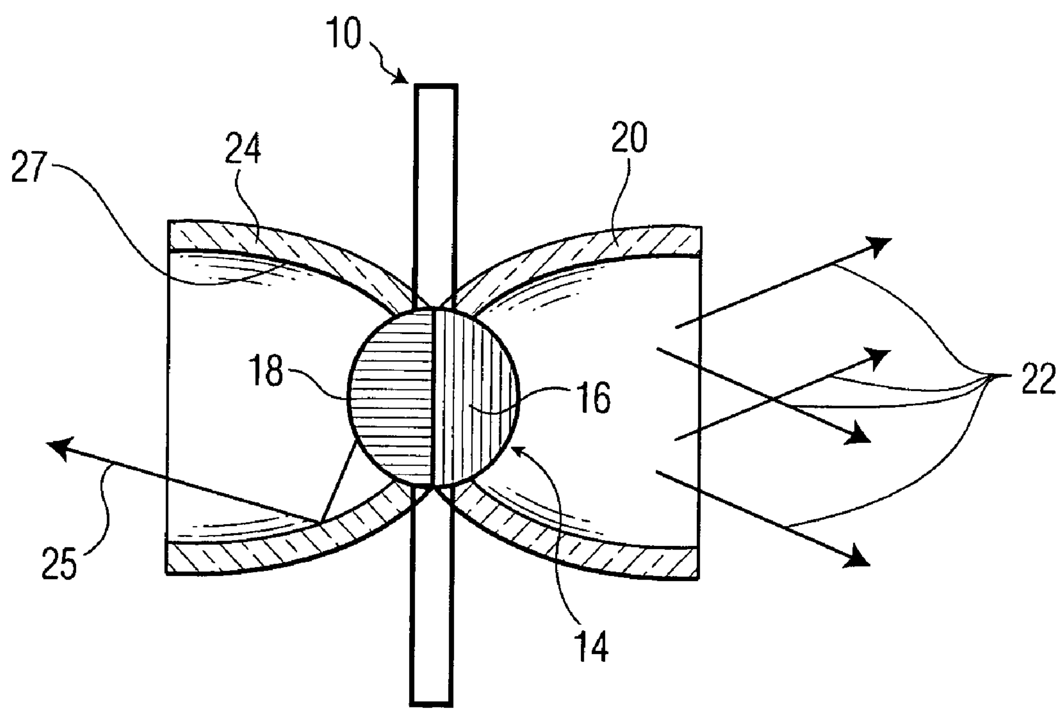
FIG. 2 is a side plan view, partially in cross section, of the light source of FIG. 1 and a pair of angle-to-area converters respectively associated with the two different optical coatings on the bulbous section of the light source.

FIG. 2 shows how angle-to-area converter 20 preferably using non-imaging optics, reduces the half angle of visible light 22 to below about 50 and preferably to about 38 degrees. This reduction of the half angle of visible light 22 allows the light to be coupled to typical fiber optic cables (not shown). FIG. 2 also shows how angle-to-area converter 24 reduces the half angle of UV energy 25 to below about 75 and preferably to about 60 degrees. Further processing of the UV energy occurs as shown in the subsequent figures.

Angle-to-area converters 20 and 24 preferably comprise a non-imaging collectors attached to respective left- and right-hand halves of arctube 10. Both converters are similar to current shape used in Product No. EFO-4+4-NC-120 sold by Fiberstars Corporation of Fremont, Calif. On the visible side converter 20, a cold mirror coating is optimized for reflecting visible light, instead of UV protection, so that efficiency is improved over the foregoing Fiberstars' product.

Converter 24 on the UV side of lamp 10 is designed for shorter (UV) wavelengths than the visible light converter 20 on other side; that is, the shape and length of the converter, as well as a UV-reflecting coating 27 on the interior of the converter are optimized for UV energy. Converter 24 preferably has a different shape than the visible light converter 20, and could be shorter than converter 20. A coating 27 for the UV converter is made to reflect UV energy, and could be made of thin film or metallic construction. The UV energy leaving converter 24 is controlled to an angle that allows efficient coupling to a solid converter 30, as shown in FIG. 3.

Figure 3:
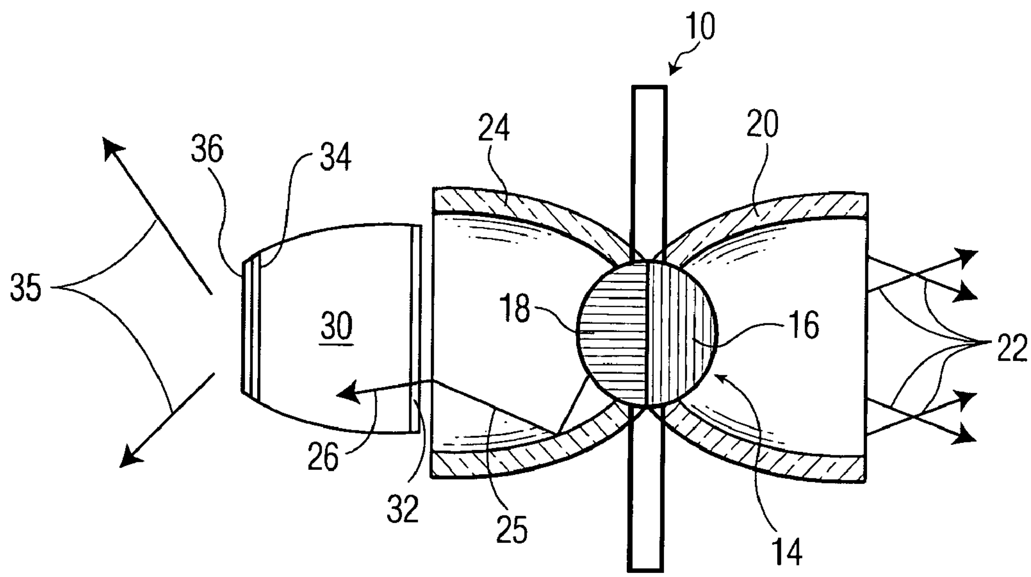
FIG. 3 is a side plan view the same as FIG. 2 but also including a solid angle-to-area converter for further conditioning of UV energy.

Referring to FIG. 3, a solid angle-to-area converter 30 that is preferably made of quartz is placed at the output side of UV converter 24. Converter 30 preferably follows the laws of non-imaging optics and increases the maximum half angle of the UV energy to a high angle that improves efficiency. The input end of converter 30 preferably has an AR coating 32 optimized for UV transmission at the determined higher angle. UV energy 25 is shown leaving converter 24 and passing into converter 30 as UV energy 26, via AR coating 36. The smaller, output end of converter 30 is coated with a thin film, cold mirror 34, for instance, that passes UV energy and reflects visible light. Atop or near mirror 34, there is a layer 36 of phosphor, which converts the UV energy into visible light, such as light rays 35 directed to the left in FIG. 3. Light is emitted by the phosphor in all directions. The light that travels to the right in FIG. 3 is reflected to the left by mirror 34.

Figure 4:
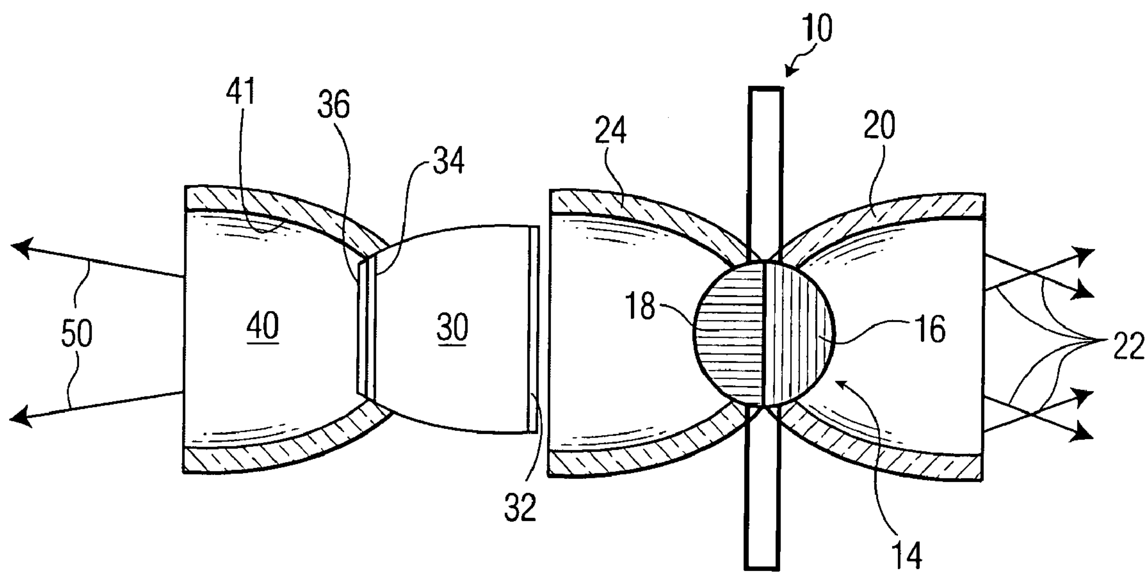
FIG. 4 is a side plan view the same as FIG. 3 but also including a further angle-to-area converter at the output of the solid angle-to-area converter of FIG. 3.

Light rays 35 emitted by phosphor 36 in the 2Pi steradians towards the left in FIG. 3 reach a final angle to area converter 40 as shown in FIG. 4, and are immediately transformed to a usable angular distribution. Mirror 34 on converter 30 reflects to the left in FIG. 3 visible light that is emitted by phosphor 36 in the 2Pi steradians towards solid converter 30. This light is reflected by mirror 34 so that it can be transmitted through phosphor 36 or absorbed in the phosphor and re-emitted as visible light, so that most of the UV energy is converted to visible light.

In brief, FIG. 3 shows how UV energy is converted to visible light. UV energy leaving the converter 24 enters a preferably solid, preferably quartz converter 30. This solid converter increases the half angle of the UV energy, preferably to 90 degrees. The output side of converter 30 is coated, preferably with thin film coatings to create mirror 34 that reflects visible light and passes UV energy. The output side of the collector is further coated with phosphor material 36 that converts UV energy to visible light.

Preferably, converter 30 is solid so that mirror 34 and phosphor layer 36 can be applied to the outlet of the converter. Alternatively, only the outlet of converter 30 could be solid, with the inlet to the converter being hollow. Further, converter 30 could be omitted, although this would reduce the conversion efficiency of UV energy to visible light, and would require the use of another substrate to hold mirror 34 and phosphor 36.

Additionally, mirror 34 could be omitted from any of the embodiments shown herein, with some loss to the total collection efficiency. This would require another substrate to hold phosphor 36.

FIG. 4 shows how the visible light from phosphor coating 36, at a preferably 90 degree half angle, is converted to a half angle of preferably 38 degrees using a preferably non-imaging angle-to-area converter 40. Converter 40 may have substantially the same shape as converter 20 used on the half of the light source that produces visible light.

Converter 40 has an interior coating 41 that is optimized for reflection of visible light. Converter 40 receives visible light at a 90 degree half angle, for instance, and converts it to a preferably 38 degree-half angle light 50. Because etendue is essentially preserved, converter 40 could be the same size and shape, and have the same coatings, as converter 20 used on the other half of the light source. Etendue is essentially maintained because converters 20, 24, 30 and 40 are properly designed as non-imaging optics with angle-to-area conversion, and because the angle of light is only slightly increased by phosphor 36, if at all.

The UV energy striking the phosphor has a broad angular distribution with extents at or near 90 degrees. That is, the phosphor absorbs light from all angles and then emits light that has a broad angular distribution with extents at or near 90 degrees. In this way, the phosphor may not have a large effect on the angular distribution of the light.

The foregoing light collection system increases efficiency of collection for visible light over existing system because substantially all of the visible light is maintained and new light is generated by converting UV energy into visible light.

The angular distribution of energy at both the arctube surface and output of solid converter 30 is very broad, with significant energy up to 80–90 degrees half angle. This requires a suitably designed thin film coating that responds differently to different groups of wavelengths (visible light vs. UV energy). This is within the ordinary skill of the art.

Figure 5:
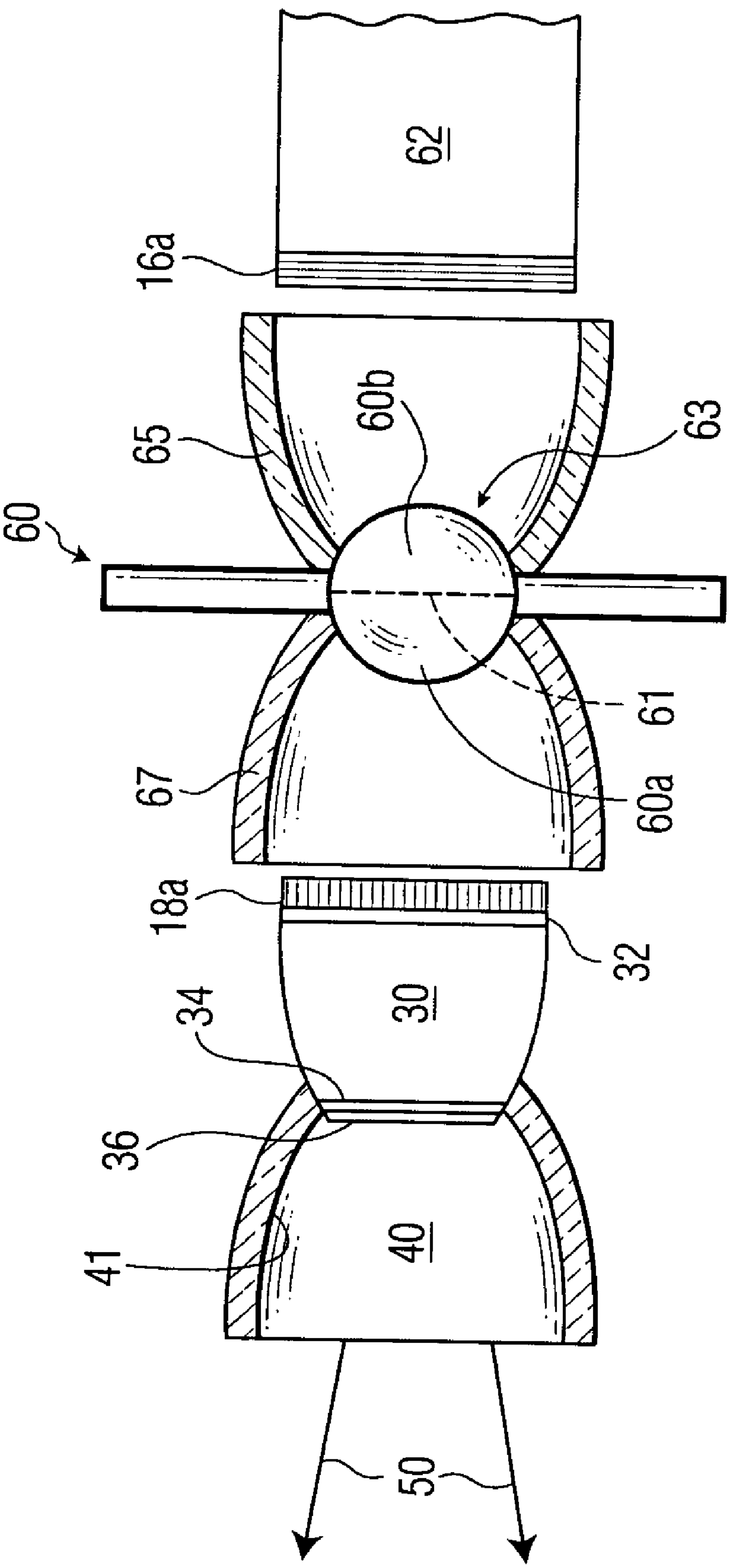
FIG. 5 is a side plan view similar to FIG. 4 but with some rearrangement or changes of parts, with vertical and horizontal cross-hatch lines corresponding to those discussed above for FIG. 1, and with a dotted vertical line on a light source added for convenience to delineate right-and left-hemispheres of a bulbous section of the light source.

FIG. 5 shows a preferred variation of the light collection system shown in FIGS. 1–4. In FIG. 5, a light source 60 is shown without coatings 16 and 18 as in FIG. 1. Rather, coating 16*a* on the inlet to a light-collecting rod 62, of solid quartz, for instance, fulfills the same general function as coating 16 of FIG. 1. That is, coating 16*a* allows visible light energy to pass to the right in FIG. 5, while reflecting UV energy back through a hemisphere 60*a* of a bulbous section 63 of the light source so that it passes to the left in FIG. 5. Similarly, coating 18*a* fulfills the same general function as coating 18 of FIG. 1. That is, coating 18*a* allows UV energy to pass to the left in FIG. 5, while reflecting visible light back through another hemisphere 60*b* of bulbous section 63 of the light source so that it will pass to the right in FIG. 5. A dotted line 61, added to FIG. 5 for convenience, delineates hemispheres 60*a* and 60*b* from each other.

Collectors 65 and 67 in FIG. 5 are designed to function well for both UV and visible light energy. For this reason, they may likely have a different shape than a collector designed for improved collection of only one of these two energy types, such as collector 20 in FIG. 4. Such collector 20 is designed, in contrast, for improved collection of visible light as opposed to UV energy. Also in contrast to collectors 65 and 67, collector 24 in FIG. 4 is designed for improved collection of UV energy as opposed to visible light. Thus, in practice, collector 65 in FIG. 5, for instance, will differ from collectors 20 and 24 in FIG. 4, since collector 65 is designed to function well for both visible and UV energy, likely resulting in design compromises that reduce the collection efficiency for visible light below that realized with collector 20.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A light collection system, comprising:

a) a light source with a bulbous section for emitting radiant energy in the direction of first and second portions of the bulbous section;

b) a reflecting surface to direct visible light from the light source to the first portion;

c) another reflecting surface to direct UV energy from the light source to the second portion;

d) a first angle-to-area converter for receiving visible light in the first portion and decreasing the angle of the visible light to a desired angle;

e) a second angle-to-area converter for receiving UV energy in the second portion and decreasing the angle of the UV energy to a desired angle;

f) a phosphor layer for receiving UV energy downstream of the second angle-to-area converter for converting the UV energy to visible light; and g) a third angle-to-area converter for receiving visible light from the phosphor and reducing the angle of such light to an angle optimized for entering a fiber optic cable.

2. The system of claim 1, wherein the first and second portions comprise substantially first and second hemispheres of the bulbous section that are opposite to each other.

3. The light pipe of claim 1, wherein:

a) the reflecting surface to direct visible light is coated on the bulbous section; and b) the reflecting surface to direct UV energy is coated on the bulbous section.

4. The system of claim 1, further comprising a fourth angle-to-area converter for receiving light from the second angle-to-area converter for increasing the angle of UV energy to about 90 degrees before delivering such energy to the phosphor layer.

5. The system of claim 4, further comprising a reflective coating on the output of the fourth angle-to-area converter that passes UV energy but reflects visible light.

6. The system of claim 5, wherein the reflective coating increases the light output of the third area-to angle-converter by reflecting visible light leaving the phosphor layer in a direction not collected by the third angle-to-area converter so as to redirect such light into the third-angle-to-area converter.

7. The system of claim 1, wherein the fourth angle-to-area converter is solid.

8. The system of claim 1, wherein the fourth angle-to-area converter is made of quartz.

9. The system on claim 1, further comprising an anti-reflective coating on an input of the fourth angle-to-area converter that allows more UV energy to enter into the converter than could enter without the coating.

10. The system of claim 1, wherein the first and third angle-to-area converters for visible light have substantially the same shape.

11. A light collection system, comprising:

a) a light source comprising a metal halide lamp with a bulbous section for emitting radiant energy in the direction of first and second portions of the bulbous section;

b) a coating on the bulbous section to direct visible light from the light source to the first portion;

c) a coating on the bulbous section to direct UV energy from the light source to the second portion;

d) a first angle-to-area converter for receiving visible light in the first portion and decreasing the angle of the visible light to a desired angle;

e) a second angle-to-area converter for receiving UV energy in the second portion and decreasing the angle of the UV energy to a desired angle;

f) a phosphor layer for receiving UV energy downstream of the second angle-to-area converter for converting the UV energy to visible light;

g) a third angle-to-area converter for receiving visible light from the phosphor and reducing the angle of such light to an angle optimized for entering a fiber optic cable; and h) a fourth angle-to-area converter for receiving light from the second angle-to-area converter for increasing the angle of UV energy to about 90 degrees before delivering such energy to the phosphor layer; and i) the first and fourth angle-to-area converters are configured to create visible light a half angle below about 50 degrees.

12. The system of claim 11, wherein the first and second portion comprise substantially first and second hemispheres that are opposite to each other.

13. The system of claim 11, wherein the first and fourth angle-to-area converters are configured to create visible light a half-angle of about 38 degrees.

14. The system of claim 11, wherein the first, second, third and fourth angle-to-area converters are coated with any of HfO2, ZrO2, and AlO2.

15. The system of claim 11, wherein the fourth angle-to-area converter comprises quartz.

* * * * *

UNITED STATES PATENT AND TRADEMARK OFFICE

CERTIFICATE OF CORRECTION

PATENT NO. : 7,008,071 B2
APPLICATION NO. : 10/793059
DATED : March 7, 2006
INVENTOR(S) : Buelow, II et al.

It is certified that error appears in the above-identified patent and that said Letters Patent is hereby corrected as shown below:

Column 1, after line 6 insert:

--GOVERNMENT INTEREST

This invention was made with Government support under Agreement Number DAAH01-03-9-R001 awarded by U.S. Army Aviation and Missile Command. The government has certain rights in the invention.--

Signed and Sealed this

Eighteenth Day of August, 2009

David J. Kappos

David J. Kappos
*Director of the United States Patent and Trademark Office*